United States Patent [19]
Kottmeier

[11] 3,923,660
[45] Dec. 2, 1975

[54] MAGNETIC APPARATUS FOR TREATING LIQUIDS CONTAINING CALCAREOUS MATTER

[76] Inventor: Merrill F. Kottmeier, 6238 Lincoln Ave., Morton Grove, Ill. 60053

[22] Filed: Aug. 26, 1974

[21] Appl. No.: 500,571

Related U.S. Application Data

[63] Continuation of Ser. No. 275,318, July 26, 1972, abandoned.

[52] U.S. Cl. .............................................. 210/222
[51] Int. Cl.² ......................................... B01D 35/06
[58] Field of Search ...... 55/100; 209/212, 213, 221, 209/223, 224; 210/222, 223

[56] References Cited
UNITED STATES PATENTS

| | | | |
|---|---|---|---|
| 2,937,710 | 5/1960 | Michael et al. | 55/100 |
| 2,951,586 | 9/1960 | Moriya | 210/223 |
| 3,206,657 | 9/1965 | Moriya | 55/100 |
| 3,376,529 | 4/1968 | Miyara | 55/100 |
| 3,680,705 | 8/1972 | Happ et al. | 210/222 |

Primary Examiner—Theodore A. Granger
Attorney, Agent, or Firm—Richard C. Lindberg

[57] ABSTRACT

Structure for treating water containing calcareous matter magnetically comprises a cylindrical outer jacket having an inlet thereto and an outlet therefrom and defining a treating chamber. Structure is mounted in the treating chamber to provide both a helical path and a direct path for the water past a magnetic field provided by magnets in a N-N and S-S relationship. The magnets are supported in tubes extending in flutes of a central fluted tube, and the helix is supported by the array of tubes so that the water has a lengthened path crossing the magnetic lines of force provided by the magnets supported in the tube array, and a direct path through the central fluted tube.

1 Claim, 5 Drawing Figures

MAGNETIC APPARATUS FOR TREATING LIQUIDS CONTAINING CALCAREOUS MATTER

This application is a continuation of application Ser. No. 275,318, filed July 26, 1972, now abandoned.

BACKGROUND OF THE INVENTION

1. The Prior Art

This invention is an improvement over the structure disclosed in Happ and Kottmeier U.S. Pat. Nos. 3,669,274 and 3,680,705.

SUMMARY OF THE INVENTION

The invention herein enables mineral bearing water to be treated magnetically by causing it to move in both an elongated path and a direct path past a magnetic field provided by a magnet array held in a plurality of elongated tubes supported in the flutes of a central fluted tube, the elongated path being provided by a helix surrounding the magnet array, and the direct path being provided by the central tube. The magnets arranged in the N-N and S-S relationship and the magnetic fields created are enhanced by separation of the like poles by non-ferrous material within the tubes supporting the magnets.

The invention disclosed herein constitutes an improvement over the prior art in that a multiplicity of magnets are held in individual tubes holding a number of magnets with their poles in opposing relationship, each tube being held in the flute of the tube having a multiplicity of flutes, with the poles of the magnets in each tube aligned with the poles of the magnets in an adjacent tube, all of the aligned magnet poles being of like polarity to increase the flux density greatly.

It is a difficult thing to mount the individual magnet arrays of each tube in a correlative flute, and the increased repulsion is difficult to maintain, the magnet poles of one tube tending to align with the magnet poles of the adjacent in an arrangement of unlike polarity, quite undesirable as the desired field flux is thereby greatly minimized.

THE DRAWING

Figure 1:
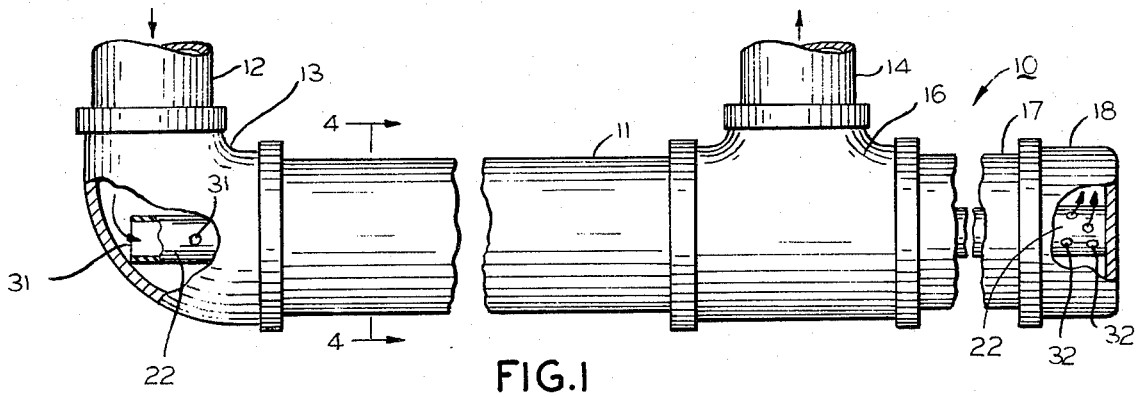
FIG. 1 is an elevational view showing the structure according to the invention.
Figure 2:
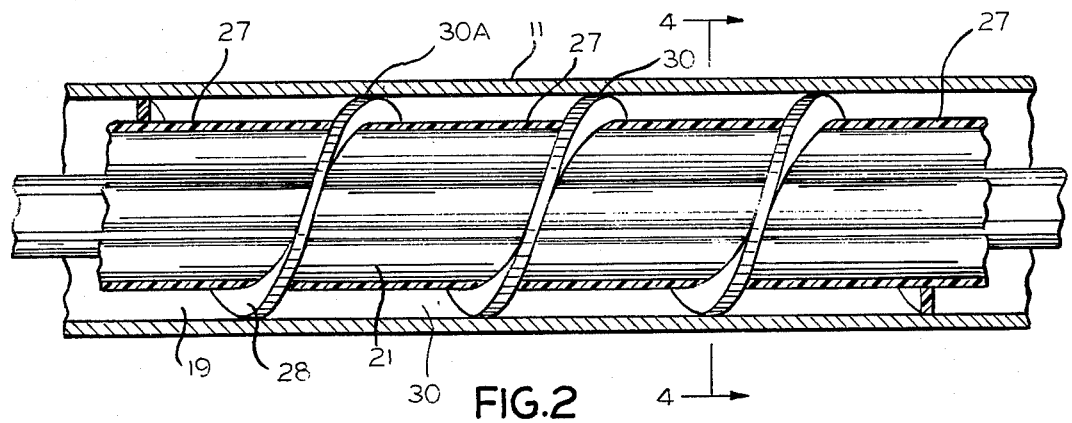
FIG. 2 is a longitudinal section through the treatment chamber of the structure of FIG. 1.

The improved apparatus according to the present invention is denoted generally by the reference numeral 10 and includes a generally cylindrical outer jacket 11 and means closing one end of jacket 11 in the form of an elbow 13 having a supply pipe 12 connected thereto.

The outer jacket 11 is also connected to a T-fitting 16, and a discharge pipe 14 is connected to the fitting 16. A short nipple 17 is connected to fitting 16 and is closed by a cap 18 to close the other end of jacket 11.

A treating chamber 19 is defined by jacket 11, and magnetic structure 21 is supported within jacket 11 and treating chamber 19 to provide both a direct path and a helical path for water bearing calcareous material past a magnetic field provided by structure 21.

Structure 21 comprises a central fluted tube 22 having a central passage 23 therein for water moving in a direct path. Tube 22 has a plurality of exterior flutes 24 thereon, each supporting an elongated tube 26.

Each of the tubes 26 encloses a plurality of permanent magnets PM arranged in N-N and S-S relationship, the magnets PM being separated by a spacer SP. The length of the spacer SP is approximately one and one-half times the diameter of the magnets PM, and the arrangement is such to provide the flux field as shown by flux lines FL. Each of the tubes is closed at the ends by a closure C.

The material of the central tube 22 and the tubes 26 is non-ferrous, and is preferably made of a resin such as ABS, the array thus far described being cemented together by a resin containing methyl ethyl ketone or the like.

Figures 3, 4:
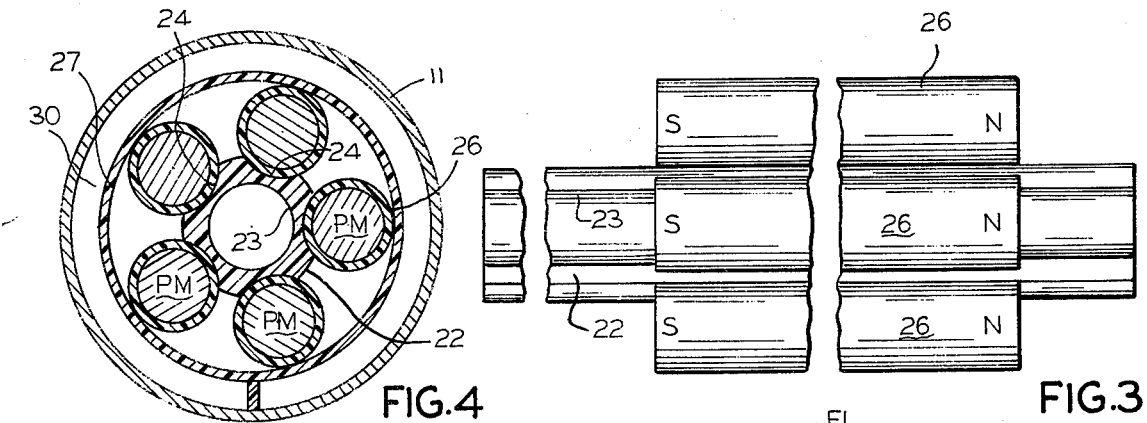
FIG. 3 is an elevational view showing details of the magnet array forming part of the treatment chamber of FIG. 2.
FIG. 4 is a transverse sectional taken along the line 4—4 of FIG. 2 looking in the direction of the arrows.
Figure 5:
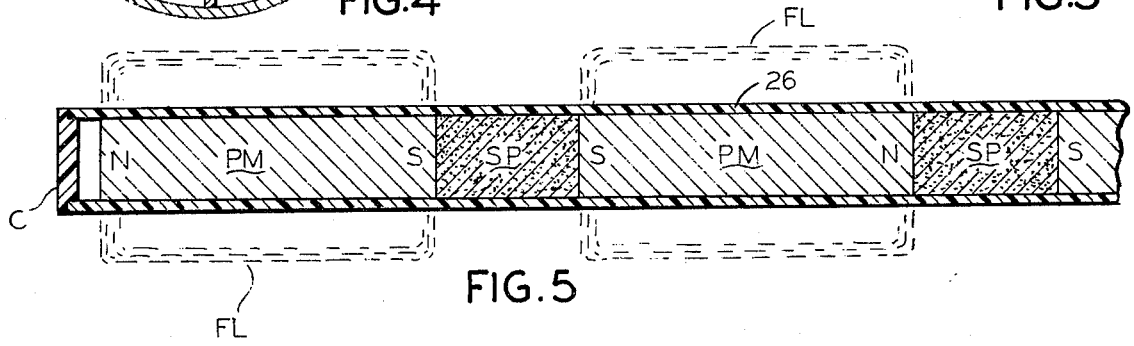
FIG. 5 is a longitudinal section through one of the tubes supporting the magnets of the array seen in FIG. 4.

It will be noted from FIG. 3 that magnets PM held in each tube 26 have their poles N and S aligned with like poles in an adjacent tube 26. The placement of the first tube 26 in a flute 23 of fluted tube 22 presents no particular problem as the first tube can readily be cemented in place. However, to obtain alignment of like poles of the magnets in an adjacent tube 26 is quite difficult as the magnets of two adjacent tubes tend to align in an N-S relationship, quite undesired.

The placement of the magnet arrays in adjacent rows is achieved seriatim, in such a fashion that endwise movement of a tube 26 in a flute 23 is achieved without endwise movement of tube 26, which would result in reduction of the magnetic retentivity. Each tube 26 is cemented in its flute 23 after placement in the fashion described.

The repulsion of adjacent tubes 26 must be overcome in the placement thereof, and this may be achieved in any convenient manner, each array be cemented into place.

The total array consisting of the separate arrays in tubes 26 thus far described are enclosed within a sleeve 27, preferably made of a suitable resin, and sleeve 27 is surrounded by a helix 28 bonded to sleeve 27 by a suitable resinous cement as described. The outer edges 30A of helix 28 are of a dimension that the described array may fit smoothly within jacket 11 and thereby provide a helical passageway 30 between sleeve 27 and jacket 11.

The helical path described by the water moving within treating chamber 19 is thus enabled to cut a maximum number of flux lines FL. Additionally, water moving within passageway 23 of central tube 22 cuts such flux lines FL.

Structure is provided for locating the magnet array within the jacket 11, and to this end, the central tube 22 is longer than the tubes 26, one end of tube 22 bearing against the interior of elbow 13 and the other end bearing against the interior of cap 18.

Entrance of water to the central tube 22 is provided by diametrical openings 31 at one end of tube 22, and discharge therefrom at the other end by similar openings 32, the discharge thereat exiting from the structure at filling 16 and discharge pipe 14. End cap 18 holds the magnet array in position, and it may be removed by unthreading cap 18.

I claim:

1. In apparatus for the treatment and conditioning of calcareous water with magnetic lines of force:
   a. a generally cylindrical outer jacket;
   b. means closing the ends of said outer jacket to define a treating chamber;
   c. a supply opening to and a discharge opening from said treating chamber;
   d. means defining a helical path of movement in said treating chamber of said water;
   e. a plurality of permanent magnet receiving tubes of non-ferrous material each of said tubes having the magnets therein arranged with like poles of contiguous magnets arranged adjacent each other to create lines of force extending laterally and longitudinally of said magnets;
   i. each of said magnets being separated from an adjacent magnet by a non-ferrous spacer having a length approximately one and one-half times the diameter of said magnets,
   f. means for arranging and supporting said tubes with the magnetic poles of the magnets in each tube being aligned laterally of each other with like poles of said magnets in alignment;
   g. said means comprising a central tube having flutes in the outer surface thereof extending longitudinally thereof;
   h. each of said magnet receiving tubes being supported in a correlative tube with the magnets therein arranged with like poles of a magnet in one tube in lateral alignment with the magnet of an adjacent tube;
   i. said first named means defining a helical path for said water causing the same to cut said lines of force to condition the water.

* * * * *